(12) United States Patent
Lefevere

(10) Patent No.: US 7,623,274 B1
(45) Date of Patent: Nov. 24, 2009

(54) THREE-DIMENSIONAL CALIBRATION USING ORIENTATION AND POSITION SENSITIVE CALIBRATION PATTERN

(75) Inventor: Francois-Marie Lefevere, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1153 days.

(21) Appl. No.: 11/020,388

(22) Filed: Dec. 22, 2004

(51) Int. Cl.
*H04N 1/04* (2006.01)
*H04N 1/00* (2006.01)

(52) U.S. Cl. .................. 358/474; 358/493; 358/406; 358/497

(58) Field of Classification Search .............. 358/474, 358/493, 497, 488, 461, 406
See application file for complete search history.

(56) References Cited

U.S. PATENT DOCUMENTS 5,764,383 A * 6/1998 Saund et al. ............... 358/497
5,835,241 A * 11/1998 Saund ....................... 358/488
6,345,763 B1 * 2/2002 Matsuda et al. ............ 235/459
6,885,479 B1 * 4/2005 Pilu .......................... 358/474
7,317,557 B2 * 1/2008 Pollard et al. .............. 358/448

OTHER PUBLICATIONS

Zhang, Z., "A Flexible New Technique for Camera Calibration," Microsoft Corporation, Technical Report, MSR-TR-98-71, last updated Aug. 13, 2008, 21 pages.

* cited by examiner

*Primary Examiner*—Houshang Safaipour
(74) *Attorney, Agent, or Firm*—Fish & Richardson P.C.

(57) ABSTRACT

Systems and methods using an orientation/position-sensitive calibration pattern for three-dimensional calibration of an imaging system, such as one used in a process for scanning documents are disclosed. The method generally includes positioning the pattern on a support, capturing images using cameras to be calibrated, each image containing at least a unique orientation and position sensitive sub-area of the pattern, determining a set of coordinate pairs of corresponding points in the image and the pattern for each image utilizing image data and pattern information, and performing optimization utilizing the sets of coordinate pairs to calibrate relative position, orientation, zoom, and/or lens distortion, etc. of each camera so as to construct a three-dimensional camera calibration model. The pattern is generally comprised of overlapping sub-areas of a minimum portion of the pattern.

35 Claims, 3 Drawing Sheets

THREE-DIMENSIONAL CALIBRATION USING ORIENTATION AND POSITION SENSITIVE CALIBRATION PATTERN

BACKGROUND OF THE INVENTION

1. Field of the Invention

The present invention relates generally to scanning documents. More specifically, systems and methods using an orientation and/or position sensitive calibration pattern for three-dimensional calibration of an imaging system, such as may be used in a process for scanning documents, particularly bound documents, are disclosed.

2. Description of Related Art

Scanning books, magazines, and other printed material into digital form has become more common with the advent of improved imaging, storage and distribution techniques. Although unbound printed material can generally be scanned with relative ease using automatic page-feeding mechanisms such as those commonly found on digital copiers and scanners, bound documents present additional challenges. Bound documents include not only books, but also periodicals, manuscripts, pamphlets, brochures, newspapers, manuals, and any other document having a bound edge. Many institutions, such as the libraries, universities, bookstores, and private enterprises have vast collections of bound documents. By converting these documents into electronic form, such institutions can reduce the cost of storage, facilitate remote access, enable simultaneous access by multiple users, facilitate search and retrieval of information, and/or protect information in rare or out-of-print works from loss or destruction.

Once the content of a bound document is scanned, the recorded image can be manipulated or otherwise processed. Digitally recorded bound documents can be de-warped, reformatted, supplemented with additional information, compressed, and/or processed with OCR (optical character recognition) software, and indexed to facilitate electronic search. Thus, scanning and recording of bound documents facilitates the creation of digital libraries that can be remotely and simultaneously accessed and searched by multiple users.

Various mechanisms have been developed to enable the scanning of bound documents. For example, a traditional flat-bed platen scanner scans bound documents in a face-down position. However, for best results, a flat-bed scanner typically requires the application of force to the spine or binding region of the bound documents to insure that they come within the scanner's depth of focus. Such force can damage the spine region of the document. In addition, using the flat-bed platen can be tedious and time-consuming, as the bound documents typically must be lifted and repositioned after each page is scanned. Further, image quality is often poor due to loss of focus, uneven illumination, and/or distortion caused by page curvature in the vicinity of the binding.

An alternative to the traditional flat-bed platen scanner is a platen-less scanner that captures image data from a bound document in a face-up position. Such scanners typically do not require application of additional stress to the binding region of a bound document, since the document is scanned in its natural, face-up position. Some such scanners may make use of automatic page turning apparatuses.

In such platen-less scanning systems, three-dimensional calibration of the imaging system may be performed to determine, for example, the exact position and orientation of the cameras, zoom factors, distortion of the lenses, etc. Conventional calibration schemes generally require the calibration pattern to be completely visible within the images of the cameras to be calibrated. Such a requirement may be extremely difficult to satisfy in a system where the cameras' fields of view may not overlap by a significant amount. Where the fields of view of the cameras do not overlap significantly, there is only a very limited area where the entire calibration pattern would be visible by all cameras. Thus, it would be desirable to provide systems and methods for improved three dimensional calibration of image capturing systems.

SUMMARY OF THE INVENTION

Systems and methods using an orientation and/or position sensitive calibration pattern for three-dimensional calibration of an imaging system, such as may be used in a process for scanning documents, particularly bound documents, are disclosed. It should be appreciated that the present invention can be implemented in numerous ways, including as a process, an apparatus, a system, a device, or a method. Several inventive embodiments of the present invention are described below.

Systems and methods using an orientation/position-sensitive calibration pattern for three-dimensional calibration of an imaging system, such as one used in a process for scanning documents are disclosed. The method generally includes positioning the pattern on a support, capturing images using cameras to be calibrated, each image containing at least a unique orientation and position sensitive sub-area of the pattern, determining a set of coordinate pairs of corresponding points in the image and the pattern for each image utilizing image data and pattern information, and performing optimization utilizing the sets of coordinate pairs to calibrate relative position, orientation, zoom, and/or lens distortion, etc. of each camera so as to construct a three-dimensional camera calibration model. Additional presentations of the pattern may be made with different positions of the pattern and/or different camera zoom and/or focus settings. The pattern is generally comprised of overlapping sub-areas of a minimum portion of the pattern.

The calibration pattern generally includes features at least some of which are marked with an orientation/position marker. The combination of the features and orientation/position markers within each sub-area renders the sub-area unique within the calibration pattern and orientation and position sensitive. For example, the calibration pattern may include a grid of features composed of alternating colored blocks, e.g., black and white, such as squares of approximately equal size. The sub-area of the calibration pattern may thus be an area of a predetermined minimum N blocks×M blocks. Each orientation/position marker may be of a size smaller than each block and of a different color than the block, e.g., white markers in black blocks and/or a black markers in white blocks. In one embodiment, the calibration pattern includes a grid of 7×9 alternating black and white squares some of which contain orientation/position markers such that the sub-area is an area of a minimum 4×4 squares.

According to another embodiment, a computer program product embodied on a computer readable medium includes instructions that, when executed by a processor, cause the processor to perform actions including positioning the pattern on a support, capturing images using cameras to be calibrated, each image containing at least a unique orientation and position sensitive sub-area of the pattern, determining a set of coordinate pairs of corresponding points in the image and the pattern for each image utilizing image data and pattern information, and performing optimization utilizing the sets of coordinate pairs to calibrate relative position, orientation, zoom, and/or lens distortion, etc. of each camera so as to construct a three-dimensional camera calibration model.

According to yet another embodiment, a system may generally include an orientation and position sensitive calibration pattern configured to be positioned on a support, the calibration pattern having a plurality of sub-areas unique within the calibration pattern, each unique sub-area being orientation sensitive and each unique sub-area being position sensitive within the calibration pattern, at least one camera to be calibrated and configured to capture images containing at least one of the unique sub-areas of the calibration pattern positioned on the support, and a signal processor configured to determine a set of coordinate pairs for each image utilizing image data and pattern information regarding the calibration pattern, each coordinate pair including coordinates of corresponding points in the image and in the calibration pattern, the signal processor is further configured to perform optimization utilizing the sets of coordinate pairs for each image to calibrate at least one of relative position, orientation, zoom, lens distortion of each camera so as to construct a three-dimensional calibration model of the camera.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods using an orientation and/or position sensitive calibration pattern for three-dimensional calibration of an imaging system, such as may be used in a process for scanning documents, particularly bound documents, are disclosed. The systems and methods as described in the examples presented herein are well suited for imaging documents such as bound documents and/or unbound documents including large, fragile, and/or rare unbound documents. However, the systems and methods can similarly be adapted or utilized for various other imaging applications in which three-dimensional calibration of the imaging system is desired. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
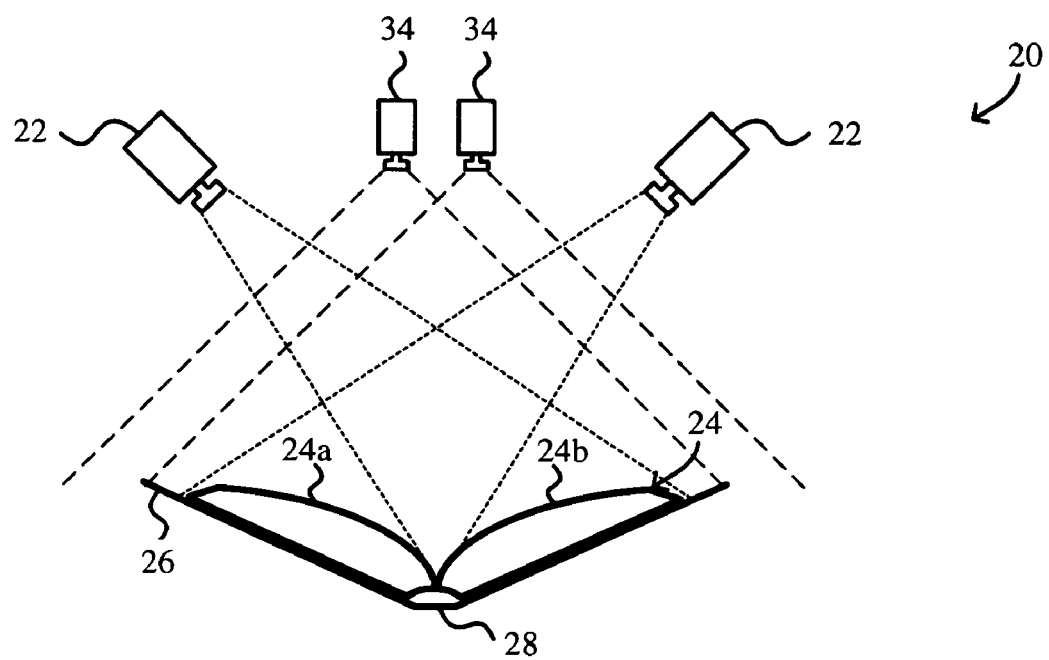
FIG. 1 is a schematic diagram of an exemplary embodiment of an image capturing system for which three-dimensional calibration may be performed using an orientation and/or position sensitive calibration pattern.
Figure 2:
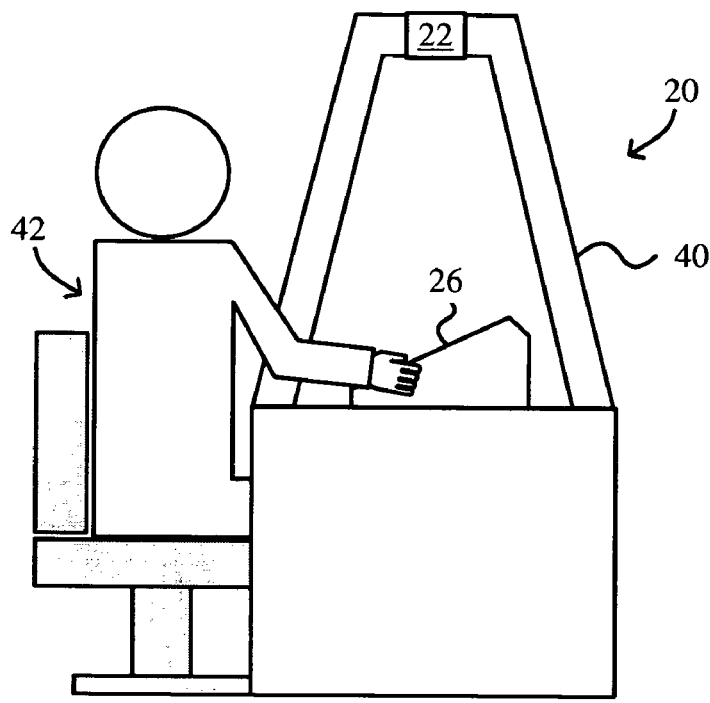
FIG. 2 is a side view illustrating an operator at the image capturing system of FIG. 1.

FIG. 1 is a schematic diagram of an exemplary embodiment of an image capturing system 20 for which three-dimensional calibration may be performed using an orientation and/or position sensitive calibration pattern. FIG. 2 is a side view illustrating an operator 42 at the image capturing system 20 of FIG. 1. The image capturing system 20 generally includes one or more imaging cameras 22, such as two high resolution cameras each for imaging or photographing a corresponding facing page 24a, 24b of an open bound document, such as a book 24, resting in a support, such as an angled cradle 26, a table top, or a mechanical device specially adapted for holding books and other documents. It is to be understood that although a book is used herein in describing the imaging system and process, the system and process may be utilized to and/or adapted for use in the imaging of any other suitable type of bound documents such as periodicals, manuscripts, pamphlets, brochures, newspapers, manuals and/or any other types of documents having a bound edge, typically with a hard or soft cover. The system and process may also be utilized and/or adapted for use in the imaging of unbound documents and/or various other applications in which three-dimensional calibration of the imaging system is desired. Furthermore, although the imaging cameras 22 are shown as an exemplary image capturing mechanism for the image capturing system 20, any other image capturing mechanism such as a camera in combination with moving mirrors may be employed. The system 20 may include a housing 40 or other structure to house or otherwise support the imaging cameras 22, lighting mechanism, and/or other components of the image capturing system 20. The imaging cameras 22 facilitate in converting the facing pages 24a, 24b into electronic form for processing using, e.g., optical character recognition (OCR) techniques to produce an editable and/or searchable version of the document's text.

Typically, the image capturing system and in particular, the cameras 22, 34, can be calibrated to determine the relative positions, orientations, zooms, lens distortions, etc. of the cameras 22, 34. The calibration process generates a three-dimensional calibration model which may then be utilized to perform image processing to rectify the captured images. Without calibration of the cameras 22, 34, the image quality and/or OCR accuracy can decrease. To calibrate the cameras 22, 34, the cameras 22, 34 captures images of a calibration pattern positioned on the cradle 26 and image data from the captured images can then be used to build the three-dimensional calibration model for the image capturing system. In particular, for each image of the calibration pattern captured by a camera, the calibration process obtains a set of coordinate pairs, i.e., the coordinates of a point in the image and the coordinates of the corresponding point in the calibration pattern. In general, a greater number of coordinate pairs obtained results in better calibration. Merely as an example, 20 coordinate pairs for each image are obtained in one embodiment. Coordinates in the calibration pattern may be pre-assigned. Merely as an example, a top left corner of the calibration pattern may be assigned coordinates (0, 0) while a top right corner of the calibration pattern may be assigned the coordinates (7, 0), etc. Using the various sets of coordinate pairs from the multiple images and/or presentations of the calibration pattern, optimization may then be performed to determine the positions of the cameras, orientations, zooms, lens distortions, etc. This optimization process is known in the art and is not discussed in further detail herein. The three-dimensional calibration model can then be used to approximately rectify the images of the target object, e.g., the facing pages 24*a*, 24*b*, captured by the imaging cameras 22. As is evident, a higher quality three-dimensional calibration model increases the quality of the resulting processed images of the pages 24*a*, 24*b* and the accuracy of any OCR performed on the processed images. Ideally, the three-dimensional calibration process can be simply, quickly, and cost effectively performed in order to maximize the throughput of the image capturing system 20.

Figure 3:
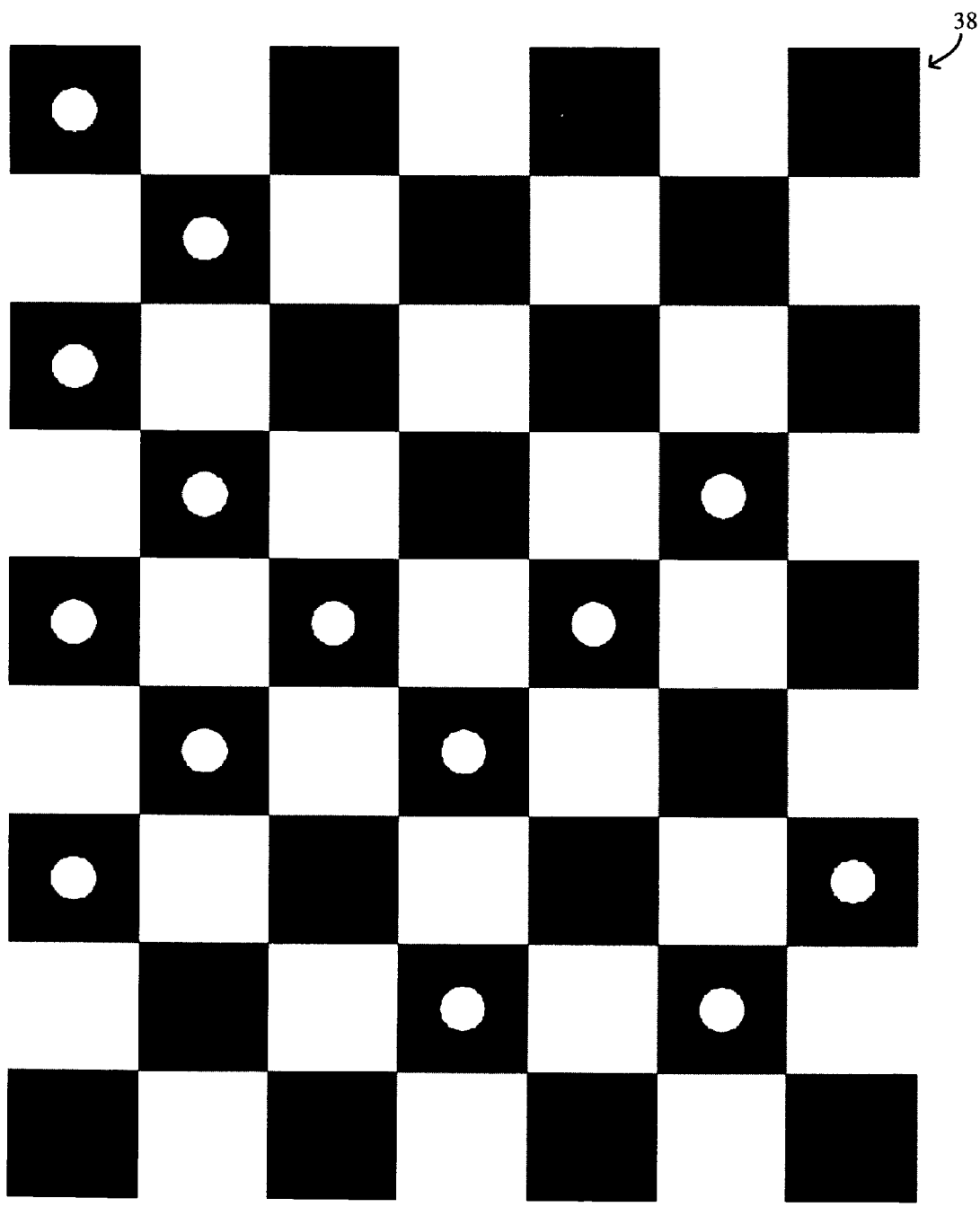
FIG. 3 is an example of a suitable orientation and/or position sensitive calibration pattern for three-dimensional calibration.

To improve the quality of the three-dimensional calibration model, an orientation and/or position sensitive calibration pattern 38 such as one shown in FIG. 3 may be positioned on the cradle or other support for the target object. The calibration pattern 38 is imaged by the cameras 22, 34 and the image data is processed to construct a three-dimensional calibration model. The exemplary calibration pattern shown in FIG. 3 includes various features or delineations such as corners or borders between alternating black and white blocks resembling a checkerboard pattern. The calibration process may locate the delineations, e.g., by locating the corners and/or borders between the black and white blocks or squares in the calibration pattern 38. In addition, the exemplary calibration pattern 38 also includes various location and/or orientation markers (e.g., circles) in a subset of the blocks such that the absence/presence of the location and/or orientation markers facilitates in uniquely identifying the position and/or orientation of the calibration pattern 38 within the image. In the exemplary calibration pattern 38 shown, some of the black squares are marked with white circular dots although various other combinations of shapes (e.g., squares, rectangles, ovals, triangles, etc.), sizes, and/or colors may be employed Additionally or alternatively, the white squares may be similarly marked with black location and/or orientation markers. It is to be understood that the pattern in FIG. 3 is merely one example of a suitable calibration pattern and numerous other suitable calibration patterns may similarly be employed. The use of an orientation/position sensitive calibration pattern allows the use of partial images of the pattern to fully parameterize the calibration model such that there are fewer limitations in the way the images are captured.

It is noted that conventional patterns used for calibration of image capturing systems are generally orientation and position insensitive. Such orientation and position insensitive patterns generally require the calibration pattern to be completely visible within the images of the cameras to be calibrated. Such a requirement may be extremely difficult to satisfy in a system where the cameras' fields of view may not overlap by a significant amount. Where the fields of view of the cameras do not overlap significantly, there is only a very limited area where the entire calibration pattern would be visible by all cameras. In contrast, an orientation/position sensitive calibration pattern 38 as described herein does not require that the calibration pattern be completely visible within the images of the cameras to be calibrated. The orientation/position sensitive calibration pattern 38 also allows for the three-dimensional calibration to be achieved quickly and cheaply to identify the pose of the calibration target and in turn generate a three-dimensional calibration model without highly skilled usage and without excessive pattern presentation.

In the example of FIG. 3, the orientation/position sensitive calibration pattern 38 is composed of a 9×7 grid of alternating black and white squares. The calibration pattern 38 can be configured so that the pattern within any 4 square by 4 square (4×4) sub-area or sub-pattern is unique such that the pose of the pattern 38, e.g., orientation, angles, etc., can be determined from an image area covering at least a 4×4 sub-area. It is to be understood that various other sizes of sub-areas may be similarly uniquely configured for the calibration pattern 38 using various combinations of position/orientation markers, for example. The overall dimensions and/or the individual features/markers of the calibration pattern 38 may be tailored to the image area size of the cameras and/or the particular application of the image capturing system. In one embodiment, the overall dimensions of the calibration pattern 38 approximately extends the full length and width of the imaging area of each camera 22 and/or of each stereoscopic camera 34. Alternatively, the overall dimensions of the calibration pattern 38 may be greater than or less than the length and/or width of the imaging area of each camera 22 and/or of each stereoscopic camera 34. The calibration pattern may be configured such that the imaging area of each camera 22, 34 captures at least the size of the unique sub-area of the calibration pattern such that the pose of the pattern can be determined from the image data to facilitate in the construction of the calibration model. The calibration pattern may be configured such that the pose of the pattern can be determined regardless of the region that each camera images where the region encompasses at least one sub-area.

Figure 4:
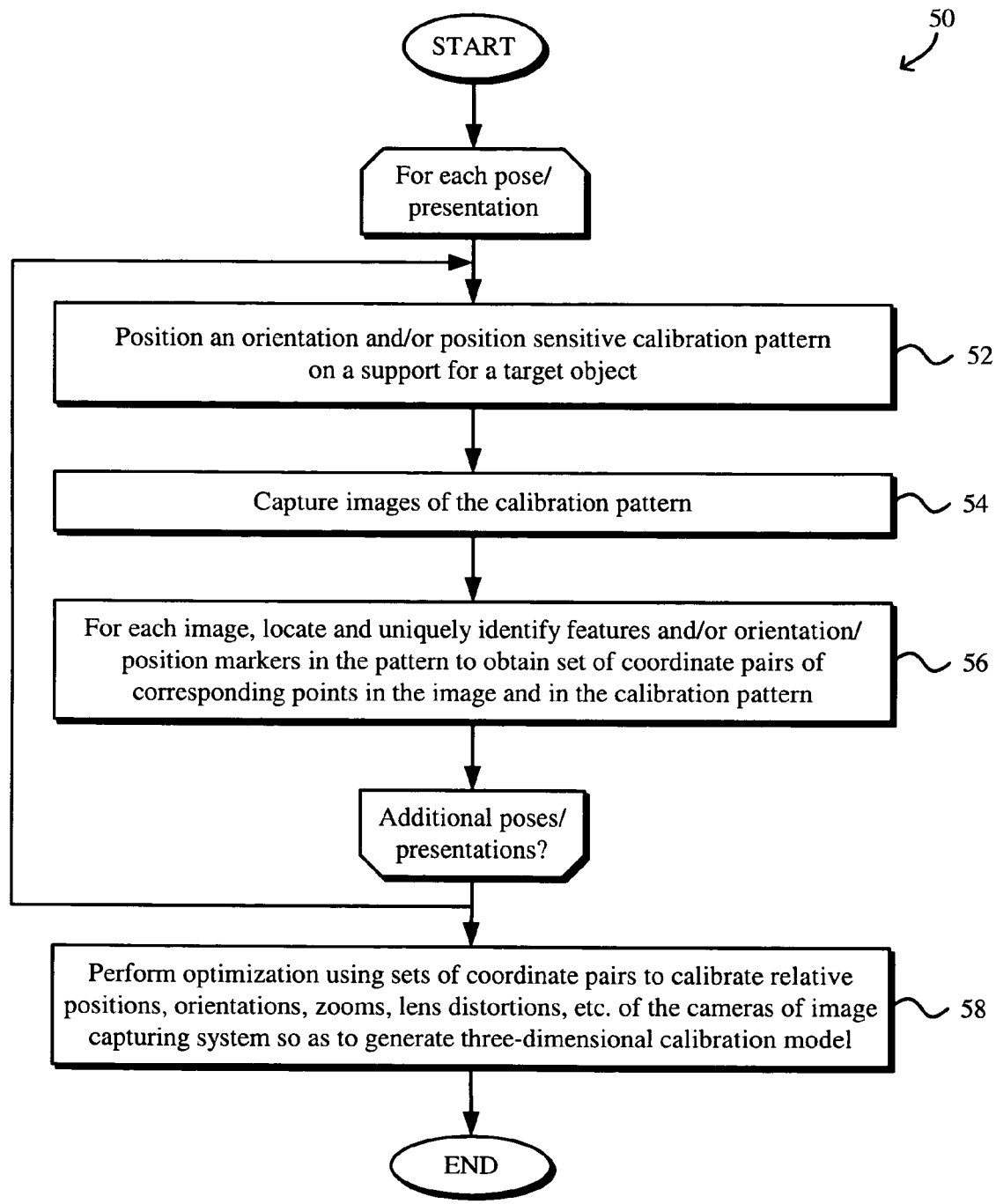
FIG. 4 is a flowchart of an exemplary process for three-dimensional calibration of an image capturing system.

FIG. 4 is a flowchart of an exemplary process 50 for constructing a three-dimensional calibration model for the image capturing system, utilizing the orientation/position sensitive calibration pattern. The process 50 performs signal processing on the images captured by cameras of the system. In particular, at block 52, an orientation and/or position sensitive pattern is positioned on a support for a target object. In the example described herein, a copy of the calibration pattern may be positioned on each side of the cradle. However, depending on the application, a single copy of the calibration pattern may be utilized. At block 54, the cameras of the image capturing system captures images of at least a sub-area of the calibration pattern.

For each image captured in block 54, features and/or orientation/position markers of the calibration pattern are identified to uniquely obtain a set of coordinate pairs at block 56. Each coordinate pair includes coordinates for corresponding points in the image and in the calibration pattern. As noted, each image generally captures at least a sub-area of the calibration pattern such that the position and orientation of the calibration pattern within the image can be uniquely determined based on the various features and/or orientation/position markers of the calibration pattern. Because the pattern is an orientation/position sensitive pattern that is input to the signal processor, the signal processor can determine the pose, e.g., orientation, angles, distances, etc., of the pattern from the data in each image. In other words, an operator would not need to specify the pose of the pattern for each presentation of the pattern nor would the operator need to adhere to a specific pattern presentation scheme.

Blocks 52, 54, and 56 may be repeated as necessary to perform additional presentations in order to fully parameterize a three-dimensional calibration model. Generally, a minimum of 4 presentations are made and typically up to 10 presentations are made. For example, the calibration pattern may be re-positioned on the support in block 52 for a different pose such that the pattern at least partially extends to areas to which the pattern previously did not extend.

After a sufficient number of iterations of blocks 52-56 are performed such that a three-dimensional calibration model may be fully parameterized, optimization is performed at block 58 using the sets of coordinate pairs to calibrate relative positions, orientations, zooms, lens distortions, etc. of the cameras of image capturing system so as to generate three-dimensional calibration model. This optimization process is known in the art and is not discussed in further detail. In particular, various suitable optimization algorithms to generate the three-dimensional calibration model, as are well known in the art, may be employed in at block 58.

In one embodiment, blocks 52-56 are repeated for each pattern presentation prior to performing the optimization at block 58 to construct the calibration model, as shown. In an alternative embodiment, the determination of whether additional presentations are needed may be made at block 58. In other words, in attempting to generate the calibration model after each iteration of blocks 52-56, the optimization process in block 58 may also determine whether there are sufficient presentations to fully parameterize the calibration model. If not, the process returns to block 52 for additional presentations.

The orientation/position sensitive calibration pattern facilitates the calibration of the image capturing system as each camera needs to only image a unique sub-area of the calibration pattern rather than the entire calibration pattern. With at least one of the unique sub-areas of the calibration pattern imaged by each camera, the pose of the calibration pattern for each image can be determined. That a given image may capture the image of any unique sub-area of the calibration pattern allows for a quicker and more cost-effective calibration process in a system where the cameras' fields of view may not overlap by a significant amount, for example. Thus, the three-dimensional calibration can be achieved quickly, efficiently and cost-effectively to identify the pose of the calibration pattern and in turn generate a three-dimensional calibration model without highly skilled usage and without excessive pattern presentation. The resulting three-dimensional calibration model in turn helps in rectifying the captured images of the target objects.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method, comprising:
    positioning an orientation and position sensitive calibration pattern on a support, the calibration pattern having a plurality of sub-areas unique within the calibration pattern, each unique sub-area being orientation sensitive and each unique sub-area being position sensitive within the calibration pattern;
    capturing images using cameras to be calibrated, each image containing at least one of the unique sub-areas of the calibration pattern;
    determining a set of coordinate pairs for each image utilizing image data and pattern information regarding the calibration pattern, each coordinate pair including coordinates of corresponding points in the image and in the calibration pattern; and
    performing optimization utilizing the sets of coordinate pairs for each image to calibrate at least one of relative position, orientation, zoom, lens distortion of each camera so as to construct a three-dimensional calibration model of the camera.

2. The method of claim 1, further comprising:
    repositioning the calibration pattern at a different position on the support; and
    repeating said capturing and determining.

3. The method of claim 1, wherein said capturing, and determining are performed at least four times.

4. The method of claim 1, wherein the calibration pattern is generally composed of generally same sized, overlapping unique sub-areas and each sub-area is an area of a predetermined minimum portion of the calibration pattern, the sub-area being position sensitive within the calibration pattern by being patterned differently from other sub-areas in the calibration pattern.

5. The method of claim 1, wherein the support is configured to support a target object to be imaged, the target object being selected from the group consisting of a bound document and an unbound document.

6. The method of claim 1, wherein the calibration pattern comprises features at least some of which being marked with an orientation/position marker, the combination of the features and markers within each sub-area rendering the sub-area unique within the calibration pattern and orientation and position sensitive.

7. The method of claim 1, wherein the calibration pattern comprises a grid of features comprising alternating colored blocks, at least some of the features being marked with an orientation/position marker, the combination of the features and markers within each sub-area rendering the sub-area unique within the calibration pattern and orientation and position sensitive.

8. The method of claim 7, wherein the blocks are squares of approximately equal size and each marker is of a size smaller than each block.

9. The method of claim 7, wherein the alternating colored blocks are alternating dark and light blocks.

10. The method of claim 9, wherein a dark block is generally black and a light block is generally white and wherein a marker in a black block is generally white and a marker in a white block is generally black.

11. The method of claim 9, wherein the calibration pattern comprises alternating generally black and generally white square blocks forming the grid, the sub-area of the calibration pattern being an area of a predetermined minimum N blocks×M blocks.

12. The method of claim 11, wherein the calibration pattern comprises 7 blocks×9 blocks and the sub-area is an area of a minimum 4 blocks×4 blocks.

13. A computer program product embodied on a computer readable medium, the computer program product including instructions that, when executed by a processor, cause the processor to perform actions comprising:
    positioning an orientation and position sensitive calibration pattern on a support, the calibration pattern having a plurality of sub-areas unique within the calibration pattern, each unique sub-area being orientation sensitive and each unique sub-area being position sensitive within the calibration pattern;
    capturing images using cameras to be calibrated, each image containing at least one of the unique sub-areas of the calibration pattern;
    determining a set of coordinate pairs for each image utilizing image data and pattern information regarding the calibration pattern, each coordinate pair including coordinates of corresponding points in the image and in the calibration pattern; and
    performing optimization utilizing the sets of coordinate pairs for each image pattern to calibrate at least one of relative position, orientation, zoom, lens distortion of each camera so as to construct a three-dimensional calibration model of the camera.

14. The computer program product of claim 13, further including instructions that, when executed by the processor, cause the processor to perform actions comprising:
    repositioning the calibration pattern at a different position on the support; and
    repeating said capturing and determining.

15. The computer program product of claim 13, wherein the capturing, and determining are performed at least four times.

16. The computer program product of claim 13, wherein the calibration pattern is generally composed of generally same sized, overlapping unique sub-areas and each sub-area is an area of a predetermined minimum portion of the calibration pattern, the sub-area being position sensitive within the calibration pattern by being patterned differently from other sub-areas in the calibration pattern.

17. The computer program product of claim 13, wherein the support is configured to support a target object to be imaged, the target object being selected from the group consisting of a bound document and an unbound document.

18. The computer program product of claim 13, wherein the calibration pattern comprises features at least some of which being marked with an orientation/position marker, the combination of the features and markers within each sub-area rendering the sub-area unique within the calibration pattern and orientation and position sensitive.

19. The computer program product of claim 13, wherein the calibration pattern comprises a grid of features comprising alternating colored blocks, at least some of the features being marked with an orientation/position marker, the combination of the features and markers within each sub-area rendering the sub-area unique within the calibration pattern and orientation and position sensitive.

20. The computer program product of claim 19, wherein the blocks are squares of approximately equal size and each marker being of a size smaller than each block.

21. The computer program product of claim 19, the alternating colored blocks are alternating dark and light blocks.

22. The computer program product of claim 21, wherein a dark block is generally black and a light block is generally white and wherein a marker in a black block is generally white and a marker in a white block is generally black.

23. The computer program product of claim 21, wherein the calibration pattern comprises alternating generally black and generally white square blocks forming the grid, the sub-area of the calibration pattern being an area of a predetermined minimum N blocks×M blocks.

24. The computer program product of claim 23, wherein the calibration pattern comprises 7 blocks×9 blocks and the sub-area is an area of a minimum 4 blocks×4 blocks.

25. A system, comprising:
    an orientation and position sensitive calibration pattern configured to be positioned on a support, the calibration pattern having a plurality of sub-areas unique within the calibration pattern, each unique sub-area being orientation sensitive and each unique sub-area being position sensitive within the calibration pattern;
    at least one camera to be calibrated and configured to capture images containing at least one of the unique sub-areas of the calibration pattern positioned on the support; and
    a signal processor configured to determine a set of coordinate pairs for each image utilizing image data and pattern information regarding the calibration pattern, each coordinate pair including coordinates of corresponding points in the image and in the calibration pattern, the signal processor is further configured to perform optimization utilizing the sets of coordinate pairs for each image to calibrate at least one of relative position, orientation, zoom, lens distortion of each camera so as to construct a three-dimensional calibration model of the camera.

26. The system of claim 25, wherein the signal processor is configured to perform the optimization by utilizing sets of coordinate pairs for at least 4 images captured by each camera.

27. The system of claim 25, further comprising the support configured to support a target object to be imaged, the target object being selected from the group consisting of a bound document and an unbound document.

28. The system of claim 25, wherein the calibration pattern is generally composed of generally same sized, overlapping unique sub-areas and each sub-area is an area of a predetermined minimum portion of the calibration pattern, the sub-area being position sensitive within the calibration pattern by being patterned differently from other sub-areas in the calibration pattern.

29. The system of claim 25, wherein the calibration pattern comprises features at least some of which being marked with an orientation/position marker, the combination of the features and markers within each sub-area rendering the sub-area unique within the calibration pattern and orientation and position sensitive.

30. The system of claim 25, wherein the calibration pattern comprises a grid of features comprising alternating colored blocks, at least some of the features being marked with an orientation/position marker, the combination of the features and markers within each sub-area rendering the sub-area unique within the calibration pattern and orientation and position sensitive.

31. The system of claim 30, wherein the blocks are squares of approximately equal size and each marker is of a size smaller than each block.

32. The system of claim 30, wherein the alternating colored blocks are alternating dark and light blocks.

33. The system of claim 32, wherein a dark block is generally black and a light block is generally white and wherein a marker in a black block is generally white and a marker in a white block is generally black.

34. The system of claim 32, wherein the calibration pattern comprises alternating generally black and generally white square blocks forming the grid, the sub-area of the calibration pattern being an area of a predetermined minimum N blocks×M blocks.

35. The system of claim 34, wherein the calibration pattern comprises 7 blocks×9 blocks and the sub-area is an area of a minimum 4 blocks×4 blocks.

* * * * *

UNITED STATES PATENT AND TRADEMARK OFFICE
CERTIFICATE OF CORRECTION

| | | |
|---|---|---|
| PATENT NO. | : 7,623,274 B1 | Page 1 of 1 |
| APPLICATION NO. | : 11/020388 | |
| DATED | : November 24, 2009 | |
| INVENTOR(S) | : Francois-Marie Lefevere | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Twenty-sixth Day of October, 2010

David J. Kappos
*Director of the United States Patent and Trademark Office*